No. 641,051. Patented Jan. 9, 1900.
J. F. STEVENS.
ELECTRICAL MEASURING INSTRUMENT.
(Application filed Oct. 4, 1899.)

(No Model.) 2 Sheets—Sheet 1.

WITNESSES:
INVENTOR
John Franklin Stevens
BY
ATTORNEY

No. 641,051. Patented Jan. 9, 1900.
J. F. STEVENS.
ELECTRICAL MEASURING INSTRUMENT.
(Application filed Oct. 4, 1899.)
(No Model.) 2 Sheets—Sheet 2.
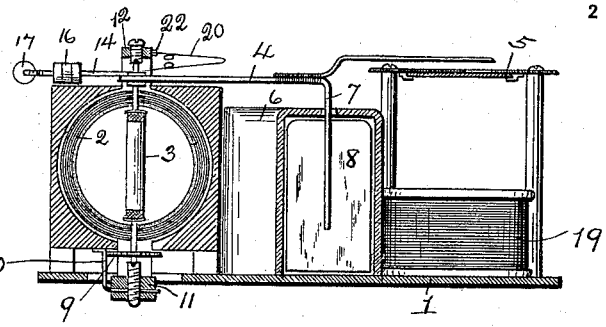
Fig 3.
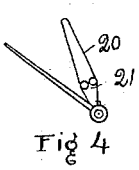
Fig 4.
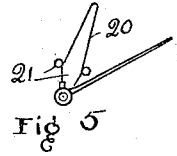
Fig 5.
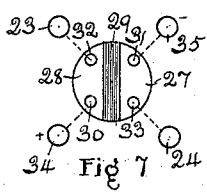
Fig 7.
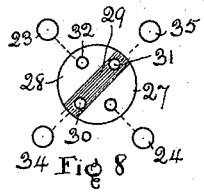
Fig 8.
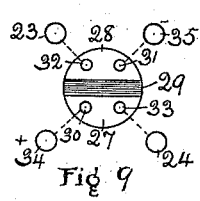
Fig 9.
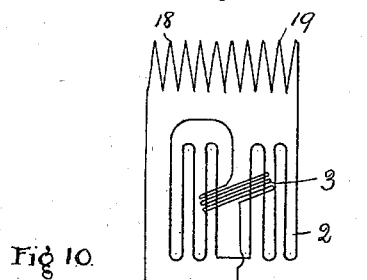
Fig 10.
WITNESSES:
John N Reeve Jr.
Mae Hoffmann
INVENTOR
John Franklin Stevens
BY Thof Teasdale
ATTORNEY
THE NORRIS PETERS CO., PHOTO-LITHO., WASHINGTON, D. C.

UNITED STATES PATENT OFFICE.

JOHN FRANKLIN STEVENS, OF PHILADELPHIA, PENNSYLVANIA.

ELECTRICAL MEASURING INSTRUMENT.

SPECIFICATION forming part of Letters Patent No. 641,051, dated January 9, 1900.

Application filed October 4, 1899. Serial No. 732,455. (No model.)

*To all whom it may concern:*

Be it known that I, JOHN FRANKLIN STEVENS, a citizen of the United States, residing at Philadelphia, in the county of Philadelphia and State of Pennsylvania, have invented a new and useful Electrical Measuring Instrument, of which the following is a specification.

My invention relates to improvements in electrical measuring instruments and belongs to that class of instruments in which two electrical conductors under the influence of a current passing through them and producing an electrical field of energy assume a changed position with reference to each other, with means for indicating such a change of position on a scale, and particularly to that class of instruments which are provided with a fixed coil and a movable coil adjacent thereto, both adapted to carry the current, whereby the movable coil arranges itself differently with relation to the fixed coil in accordance with the current and in which the said movable coil is provided with spring means for resisting the movement of the same as it is attracted or repelled by the varying intensity of the field of force of said fixed and movable coils.

Figure 1:
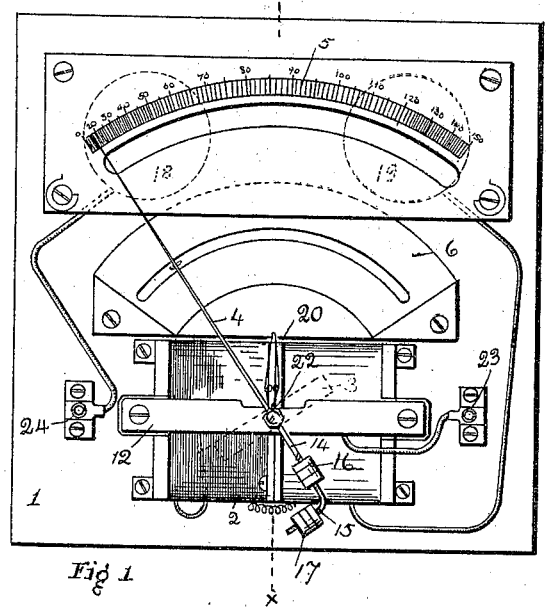
Figure 6:
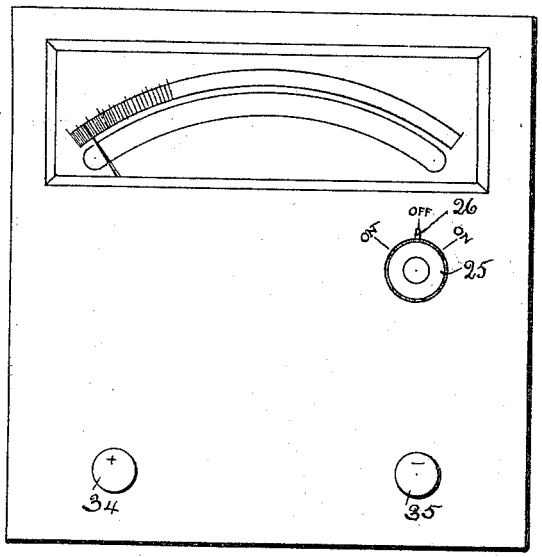

Referring to the drawings, Figure 1 is a plan view of my device removed from its box or casing. Fig. 2 is a vertical section of same on the lines *x x* of Fig. 1. Fig. 3 is a detail view of the pendulum-spring when the pointer is in the middle of the scale. Fig. 4 is a detail of same when the pointer is at zero. Fig. 5 is a similar view when the pointer is at the other end of the scale. Fig. 6 is a plan view of the inner cover of the instrument, showing the scale and pointer and mirror through the glass in its upper portion and showing the line, binding-posts, and the switch for opening and closing circuit and changing direction of current located on its lower portion. Figs. 7, 8, and 9 are diagrammatic views of the current-reversing device. Fig. 10 is a diagrammatic view showing the path of the current.

Similar numerals refer to similar parts throughout the several views.

On a suitable base 1 is properly mounted and secured the fixed coil 2, within which is pivoted the movable coil 3, said coils connected in circuit, as will hereinafter be described. To the pivot of the movable coils 3 is secured the pointer 4, which is adapted to sweep over the scale 5, said scale also being fixed by proper supports to the base-plate 1. Midway between the coils and the graduated scale is located and secured to the base-plate a dash-box 6, shaped in the arc of a circle concentric with the pivot of the movable coil and having a slot at the top in a similar arc, as shown in Fig. 1. Depending from the pointer 4 is the vertical limb 7, secured to the vane 8, which moves within the dash-box 6 to cause the dead-beat of the pointer. At the rear of the pivot—that is, extending diametrically opposite from the pointer—is the threaded arm 14, with the right-angular bend 15, but all lying in the horizontal plane. This arm is provided with the threaded weights 16 and 17 to secure the proper balance as adjustable means for counterbalancing the weight of the pointer and vane.

To the lower end of the pivot of coil 3 is secured one end of the spiral spring 9, the other end being secured to an adjustable abutment 10, electrically connected with the bar 11, (shown in section in Fig. 2,) being similar in shape and form to bar 12. (Shown in Fig. 1.) This spring 9 is adapted normally to hold the point at zero on the graduated scale and to resist the movement of the movable coil caused by the magnetic field of the two coils when the current is flowing through same. It also serves as an electrical conductor between the fixed and movable coil.

As shown in Fig. 1, when the pointer 4 is at zero the movable coil lies with its vertical plane divergent to the vertical plane of the fixed coil. As the current flows through the coils 2 and 3 in accordance with the well-known law the magnetic field therein created will tend to bring the movable coil to such a position that the lines of force in the two coils will be parallel, thus causing the rotation of the movable coil against the tension of the spiral spring, the force of the magnetic field being proportionate to the square of the intensity of the current, said movements being in my invention against the gradually-increasing tension of a spring so modified that it will closely follow this law of attraction and repulsion, as I shall describe.

At the upper corners of the base-plate 1 are secured bobbins 18 and 19, wound non-inductively with fine wire, connected in series with coils 2 and 3 to secure the amount of resistance desired, through which the current to be measured must flow.

I will now proceed to describe the spring mechanism upon which the delicacy and accuracy of my instrument depend. As I have already stated, the movement of the movable coil varies according to the square of the intensity of the current—that is to say, if for an intensity of two the movement is four for an intensity of three the movement or strain would be nine, and so on.

For measuring small potentials or quantities it is therefore necessary that the springs should act with the greatest possible freedom and accuracy and move with the smallest impulses, and yet as the intensities increase the springs must gather resistance far more rapidly than would be possible with long and delicate springs used in the ordinary manner. For example, suppose the spring was made to register the weight of a quarter of a grain at zero of the scale. Even this would be far too much to measure minute fractions of a volt; but starting with a quarter of a grain when the pointer had passed, say, half-way over the scale the spring would have doubled its resistance, making that now one-half a grain, and at its final sweep one grain. The electrical pulls increase far more rapidly than this. Even if a spring be taken with an initial pull at zero of three and one-fourth grains it would at the middle have reached six and one-half, and at the end thirteen grains; but in securing this increase all accuracy is lost for the lowest voltages. What is necessary is to have (in such case) a spring which will measure a quarter of a grain or less at zero and increase swiftly to sixteen grains or more at the end of the scale. I have by my present invention accomplished this result in the following manner:

It is well known that if a long coiled spring of any lightness be used it cannot give accurate results if it begin to register in an entirely-unwound condition. The first movements in such case are weak and irregular, the metal having to take up its own index of displacement first. It is for this reason, as I have said, that a long coiled spring requires to start under tension, and if it be light enough to give readings under such tension at the zero end it will fail to record high enough along the scale, while if two similar springs be used to secure the latter readings they will still more prevent delicacy in the lower ones. In my invention I use a spiral spring 9, as shown in Fig. 2, which is of considerable strength, greater than would permit the indication of any of the lower voltages by itself, but which by itself would suffice to secure accurate readings along about the middle of the scale—that is to say, such a spiral spring as would for a difference of potential of eighty volts permit the pointer 4 to indicate the same, but which might require five or ten volts to move it at zero. This spring 9 is counteracted by the pendulum-spring 20, as shown in Figs. 1 and 2. This spring, of very fine wire, is in the form of an inverted V. In each leg is a single turn 21. One end of the spring is secured to the abutment 22 on bar 12 and the other is rigidly secured to the pivot of coil 3. The legs of springs 20 lie in different horizontal planes and the turns 21 are transverse, so that the leg of the spring secured to the pivot-pin can swing either to the right or to the left past the leg attached to the abutment 22 in the manner of a spring-controlled pendulum, for which reason I call it a "pendulum-spring." For instance, for the first part of the advance of the needle from zero spring 20 pulls against the spiral spring 9 and assists the impressed movement of the movable coil caused by the magnetic field, while its operation is just the reverse after the pointer passes the middle part of the scale toward the last position. If spiral spring 9 is wound up, by turning its free end to the left it will swing the pendulum-spring into the position shown in Fig. 4, when it has just barely overbalanced the tension of said pendulum-spring, and the pointer will stand at zero, with a strain representing the differential between springs 9 and 20, but not the separate spring tension of either. Let the tension at zero of spring 9 be three and one-fourth and the opposite tension of the spring 20 be three, then the pointer at zero will be in a state of unstable equilibrium, represented by one-quarter, and this will be a position of high elasticity also—that is, the resultant spring resistance at zero will be only one-thirteenth that of the spring 9 itself. Let a strain be now applied to the movable coil, causing it to rotate so as to carry the pointer 4 to the right along the scale. The turns 21 of spring 20 and its length also will now, so to speak, unroll, and to that extent by a gradually-decreasing pull it will enable the spring 9 to more and more nearly exert its own tension until when the spring 20 has reached the position shown in Fig. 3 the pendulum-spring will cease to act in either direction and the normal tension of the spring 9 will be reached, excepting that instead of starting at its own strain of three and one-fourth and going up to six and one-half it has started at one-quarter only and in the same distance gone to six and one-half. If the pointer continues to be forced over by the continued movement of the movable coil, the spring 20 will now assume the position at the end of the scales as shown in Fig. 5. At this point, commencing at the middle with no effective tension, the pendulum-spring will add its own force of three to the spiral spring, so that the spiral spring registering a resistance of double again, or thirteen, the three of the pendulum-spring will make its final pull sixteen.

I do not wish to limit myself to the specific form of pendulum-spring shown in the drawings, as I may use any form of spring sufficiently delicate and resilient adapted to vibrate under tension from one side to the other of its position of equilibrium and acting upon the spiral spring 9 to counteract the tension of the same during one part of its movement and reinforce the same during the latter part of its movement without departing from the spirit of my invention. In this way, as I have stated, I provide an exceedingly-sensitive spring means for the minute measurements at the beginning of the scale, and I rapidly increase these approximately to accord with the laws of electrical and magnetic attractions, and not merely directly, in an arithmetical ratio, as a coiled or spiral spring will do.

As shown diagrammatically in Fig. 10, the current enters at 34, passes through contact-plate 28, through coil 3, thence through coil 2, thence through resistance 18 and 19, and thence through plate 27 to post 35.

Upon the wooden inside cover of the case is placed a rotatable thumb-button switch 25, carrying a pointer 26, which with respect to three points marked on the board is adapted to indicate the positions of the switch in which the current is on and in which it is off. The construction of this switch is as follows: On the lower side of the button are secured contact-plates 27 and 28, separated by the non-conductor piece 29. Suitably located beneath these plates and adapted to be contacted thereby are the four fixed terminal points 30, 31, 32, and 33, two of which, 30 and 31, are connected with the line binding-posts 34 and 35 and two, 32 and 33, with the terminals 23 and 24 of the instrument. When the thumb-button is in the position as shown in Fig. 7, assuming that binding-post 34 is the positive post and 35 the negative, then, the plate 28 connecting 30 with 32 and plate 27 connecting 31 with 33, the current will proceed through the instrument from 23 to 24. In Fig. 8 the button is so turned that the binding-post terminals rest upon the non-conductive piece 29 and no current will flow through the device. As shown in Fig. 9, plate 27 is shown as connecting contact 30 of the binding-post 34 with the contact 33 of instrument-terminal 24, and plate 28 the contact 31 of binding-post terminal 35 with contact 32 of instrument-terminals 23, so that the current will then be reversed from the direction shown in Fig. 7 and will flow through the instrument from 24 to 23.

What I claim is—

1. In an instrument for measuring electricity a fixed coil, a movable coil adapted to oscillate on diametrical pivots, a spiral spring connected with said movable coil, and an opposite pendulum-spring also connected with the movable coil and adapted to vibrate under tension from one side to the other of its position of equilibrium and to counteract the tension of the spiral spring during the first part of its movement and to reinforce the same during the latter part of its movement, substantially as and for the purpose herein set forth.

2. In an instrument for measuring electricity in combination with a fixed coil, a movable coil supported on diametrical pivots, a spiral spring secured to one of said pivots and having initial tension in excess of the lower potential of electricity to be measured, and a pendulum-spring secured to the pivot of the movable coil and adapted to coöperate with the spiral spring so as to diminish the resistance of said spring at zero, and by gradually approaching its position of equilibrium to restore the spiral spring to its full potential, substantially as described.

3. In an electrical measuring instrument a fixed and movable coil, and a circuit in series through the same in combination with a pointer and scale to indicate the movement of said movable coil under attraction or repulsion, and a spring in excess of initial movement to resist the same in combination with a counter-spring adapted to resist the tension of said spring, said movable coil and said pointer on said scale indicating, by the differential between said spring and said counter-spring under the action of said circuit, substantially as described.

4. In combination with a pivoted coil and a pointer rigidly secured to the same, a scale spaced off and traversed by said pointer, a spring adapted to act upon said pivoted coil and resist the same, and a counteracting-spring adapted to modify and vary the action of said spring on said coil in a constant and graduated resistance, substantially as described.

5. In an electrical measuring instrument having a fixed and movable coil, said coils mutually reacting upon each other in an electrical circuit, a pointer and a scale connected with and marked with indications of said instrument, and two springs acting on each other to modify and vary the tensions of each, and resisting the movement of said movable coil by the differential between the tensions of said springs first by reducing and afterward by adding to said tensions, substantially as described.

6. In an electrical measuring instrument in combination with a fixed and movable coil, and a spiral spring connected with said movable coil and resisting the rotation of the same, a pendulum-spring consisting of two divergent legs in the form of an inverted V one adapted to swing past the other, one leg secured to the pivot of said movable coil, and the other to a fixed abutment, so that said pendulum-spring will be drawn to one side to resist said spiral spring, while recording the lower electrical intensities, and gradually passing, as said coil rotates to the opposite side to add thereto, substantially as described.

7. In an electrical measuring instrument in combination with a pivoted coil, a mainspring adapted to resist strain, but in excess of strain of lowest resistances of said pivoted coil, a pendulum-spring in the form of an inveted V having a turn on each leg and below said turns attached rigidly one end to a fixed abutment, and the other end to the pivot of the movable coil and adapted to resist said mainspring and record weights in pressure by the differential between the tension of said springs, substantially as described.

8. As an article of manufacture a pendulum-spring consisting of two legs joined at the top and composed of a single length of elastic wire, and having a turn formed on each leg and below said turns a straight end, said straight ends adapted to be rigidly secured one to a fixed abutment and the other to an oscillating pivot, and said legs adapted to swing past each other as said pivot oscillates, substantially as described.

9. In an electrical measuring instrument the combination of the fixed coil 2, 2' a pivoted movable coil 3, a pointer 4, a scale 5, a spiral spring 9, a counteracting pendulum-spring 20 and a resistance 18, the whole mounted upon a base-plate substantially as and for the purpose described.

10. In combination with coils 2, 2' and coil 3 the latter pivoted diametrically, the pointer 4 secured to coil 3 or its supports, the scale 5, the spring 9 and the counter-spring 20, the whole constructed to operate, substantially as described.

11. In combination with the rotating pivoted coil 3, the pointer 4, the scale 5 together with spring 9 and counter-spring 20, substantially as and for the purpose described.

12. In a switch for an electrical measuring instrument the combination of a manually-operative rotatable member provided with two conducting-plates and an insulating-piece therebetween so disposed with respect to fixed contacts connected respectively with the terminals of the line, and of the instrument as to open, to close and to change the direction of the current through the instrument by turning the manually-operative member, substantially as described.

13. In an instrument for measuring electricity in combination with a fixed coil, a movable coil diametrically pivoted within the same, a spring adapted to resist the movement of said coil when a current is passed through said coil or coils, a differential spring adapted to oppose said spring and a pointer attached to and moving with said movable coil, together with a scale graduated and spaced so that the spaces and graduations increase in extent from zero along a part of the same and afterward diminish therefrom to end of scale, said spaces indicating units or multiples of units of electrical measurement.

14. In an instrument for measuring electricity in combination with a fixed coil, a movable coil pivoted to oscillate within the same, said coils connected in series and a rotary thumb-button provided with two switch-plates and an interposed insulating-piece so disposed with respect to fixed contacts connected with the terminals of the line and of the instrument as to open, to close and to change the direction of the current through the instrument by turning said button.

15. In a switch for an electrical measuring instrument the combination of a manually-operative rotatable button 25 carrying upon its under side the conducting-plates 27 and 28, and the interposed insulating-piece 29 so disposed with respect to the fixed contact-terminals 30, 31, 32 and 33, as to open, to close and to change the direction of current through the instrument by rotating the button 25, substantially as described.

16. In a switch for an electrical measuring instrument the combination of a manually-operative rotatable button 25 carrying upon its under side the conducting-plates 27 and 28, and the interposed insulating-piece 29 so disposed with respect to the fixed contact-terminals 30, 31, 32 and 33, as to open, to close and to change the direction of current through the instrument by rotating the button 25, and a pointer 26 carried by said button and marks upon the stationary part of the casing to cooperate therewith in indicating when the current is on and when off, substantially as described.

JOHN FRANKLIN STEVENS.

Witnesses:
  MAE HOFFMANN,
  JNO. STOKES ADAMS.